(12) United States Patent
Chang

(10) Patent No.: US 6,997,148 B1
(45) Date of Patent: Feb. 14, 2006

(54) ENGINE VALVE ACTUATOR

(75) Inventor: David Yu-Zhang Chang, Lawrenceville, GA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/966,901

(22) Filed: Oct. 15, 2004

(51) Int. Cl.
F01L 9/02 (2006.01)

(52) U.S. Cl. .............................. 123/90.12; 123/90.15; 123/90.16; 123/90.63; 123/198 F; 251/101; 251/102; 92/13.6; 92/13.8

(58) Field of Classification Search ............ 123/90.12; 251/101, 102
See application file for complete search history.

(56) References Cited

U.S. PATENT DOCUMENTS

| 5,161,501 A | 11/1992 | Hu |
| 5,511,460 A | 4/1996 | Custer |
| 6,273,057 B1 * | 8/2001 | Schwoerer et al. ......... 123/321 |
| 6,302,370 B1 * | 10/2001 | Schwoerer et al. ........... 251/48 |
| 6,474,296 B2 | 11/2002 | Cornell et al. |
| 6,708,656 B1 | 3/2004 | Chang |

* cited by examiner

Primary Examiner—Thomas Denion
Assistant Examiner—Kyle M. Riddle

(57) ABSTRACT

An engine valve actuator for an internal combustion engine is provided. The actuator includes a housing having an opening. An adjustment member is disposed in the housing and defines a fluid chamber having a chamber wall. A piston is also disposed in the opening. The piston defines a piston chamber and has a pressure surface, a protrusion extending from the pressure surface, and a groove disposed in the pressure surface surrounding the protrusion and in fluid communication with the piston chamber. A fluid passageway is adapted to controllably communicate pressurized fluid to the housing opening. A push rod is operatively engageable with the piston and is adapted to controllably actuate an engine valve of the engine.

22 Claims, 4 Drawing Sheets

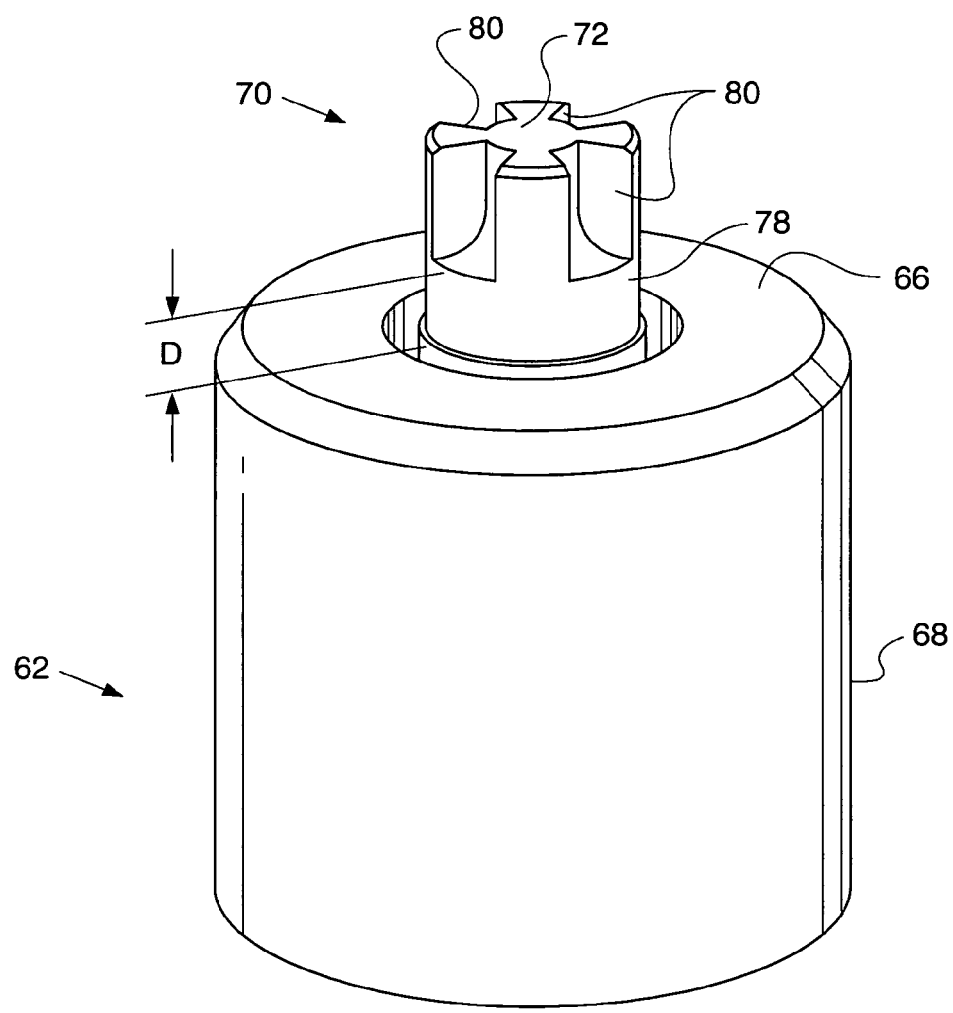
FIG_4_

ENGINE VALVE ACTUATOR

TECHNICAL FIELD

The present disclosure is directed to an actuator for an engine valve and, more particularly, to an anti-lash and travel-limiting mechanism for an engine valve actuator.

BACKGROUND

Many vehicles and machines, such as, for example, automobiles and on and off highway trucks, include an internal combustion engine that provides power for the vehicle. A typical internal combustion engine includes a number of intake and exhaust valves that control the flow of gases to and from the combustion chambers of the engine. The engine may also include a valve actuation system, such as, for example, a cam-driven valve actuation system, to control the actuation timing of the engine valves.

The overall performance of the internal combustion engine may be improved by using auxiliary valve actuators, such as, for example, hydraulically powered actuators, that actuate the engine valves to selectively implement variations on the cam-driven valve timing. For example, the auxiliary valve actuators may be used to actuate the exhaust valves of the engine to implement an "engine braking" cycle. In an engine braking cycle, the auxiliary valve actuators open the exhaust valves of the engine when a piston associated with a combustion chamber is at or near a top-dead-center position of a compression stroke. This opening of the exhaust valves allows the air compressed by the piston in the combustion chamber during the compression stroke to escape from the combustion chamber through an exhaust passageway. In this manner, the pistons of the engine are selectively used as air compressors to absorb power instead of generating power in response to the combustion of fuel.

Because the auxiliary valve actuators are used only when the engine is experiencing selected operating conditions, the auxiliary valve actuators should avoid interfering with the operation of the cam-driven valve actuation system when the engine is experiencing other operating conditions. The performance of the engine may be negatively impacted if, for example, the auxiliary valve actuators inadvertently opened the exhaust valves during the intake stroke of the pistons. This type of interference may occur if the auxiliary valve actuators do not adapt to changes in the size of engine components due to thermal expansion.

To prevent such interference, the auxiliary valve actuators are typically separated from the exhaust valve assembly by a certain distance, which is commonly referred to as a "lash." The lash may prevent inadvertent or unintentional opening of the engine valves by the auxiliary valve actuators when changes in temperature of the engine cause a change in size of the engine components. However, the auxiliary valve actuators must take up the lash before engaging the engine valves to open the engine valves. This may result in the auxiliary valve actuators requiring additional fluid and/or additional time to open an associated engine valve. To obtain the best engine performance, the actuation timing of the engine valves should be controlled precisely. Accordingly, the system that controls the auxiliary valve actuators must account for the lash in each actuation of the associated engine valves.

The auxiliary valve actuators must also be controlled in a manner to prevent over-actuation or over-extension of the engine valves that could result in collision between the actuated engine valve and the engine piston. For example, if the selected operating condition under which the auxiliary valve actuator is employed to actuate the engine valve is one in which the engine piston is at or near top-dead-center of the piston stroke, over-actuation or over-extension of the valve may cause it to make contact with the piston, resulting in possible damage to the engine. To obtain the best engine performance, the distance that the engine valves are moved by the auxiliary valve actuators, sometimes referred to as valve lift, should be controlled precisely. Accordingly, it is advantageous if the system that controls the auxiliary valve actuators must also limit the amount of valve lift in each actuation of the associated engine valves.

The auxiliary valve actuator illustrated in U.S. Pat. No. 6,708,656 to Chang incorporates an improved anti-lash mechanism that addressed problems recognized in prior devices. However, Chang does not provide a needed mechanism for controlling or limiting valve lift. It is desirable to provide an auxiliary valve actuator that addresses both of the lash and travel-limit issues within a single device that is relatively simple and robust.

The engine valve actuator of the present disclosure solves one or more of the problems set forth above.

SUMMARY OF THE INVENTION

In one aspect, the present disclosure is directed to an actuator for an engine valve. The actuator includes a housing having an opening. An adjustment member is disposed in the housing and defines a fluid chamber having a chamber wall. A piston is also disposed in the opening and defines a piston chamber having a pressure surface, a protrusion extending from the pressure surface, and a groove disposed in the pressure surface surrounding the protrusion and in fluid communication with the piston chamber. A fluid passageway is adapted to controllably communicate pressurized fluid to the housing opening. A push rod is operatively engageable with the piston and is adapted to controllably actuate the engine valve.

In another aspect, the present disclosure is directed to a method of actuating an engine valve using an actuator engageable with the valve. The actuator has a housing, a piston having a pressure surface and a piston chamber and being slidably movable within an opening of the housing and engageable with the valve, a fluid passageway in communication with the opening, and an adjustment member disposed within the housing and having a fluid chamber. The method includes the steps of connecting a source of pressurized fluid to the fluid passageway and delivering the fluid to the pressure surface of the piston, causing the piston to move from a first position, to a second position at which the fluid chamber is connected to the fluid passageway responsively actuating the engine valve. Movement of the piston beyond the second position is limited by permitting the pressurized fluid to flow from the housing opening to the piston chamber, responsively relieving the pressure on the pressure surface. Disconnecting the source of pressurized fluid from the fluid passageway allows the piston to move from the second position toward the first position to a third position, disconnecting the fluid chamber from the fluid passageway and blocking the piston from returning to the first position in response to the fluid in the fluid chamber.

In yet another aspect, the present disclosure is directed to an engine having at least one engine block defining at least one cylinder, an engine piston disposed in the at least one cylinder, at least one engine valve associated with the at least one cylinder, and an actuator for the at least one valve. The actuator includes a housing having an opening. An adjustment member is disposed in the housing and defines a fluid chamber having a chamber wall. A piston is also disposed in the opening and defines a piston chamber having a pressure surface, a protrusion extending from the pressure surface, and a groove disposed in the pressure surface surrounding the protrusion and in fluid communication with the piston chamber. A fluid passageway is adapted to controllably communicate pressurized fluid to the housing opening. A push rod is operatively engageable with the piston and is adapted to controllably actuate the engine valve.

BRIEF DESCRIPTION OF THE DRAWINGS

FIG. 4 is a pictorial view of a piston in accordance with an exemplary embodiment of the present invention.

DETAILED DESCRIPTION

Figure 1:
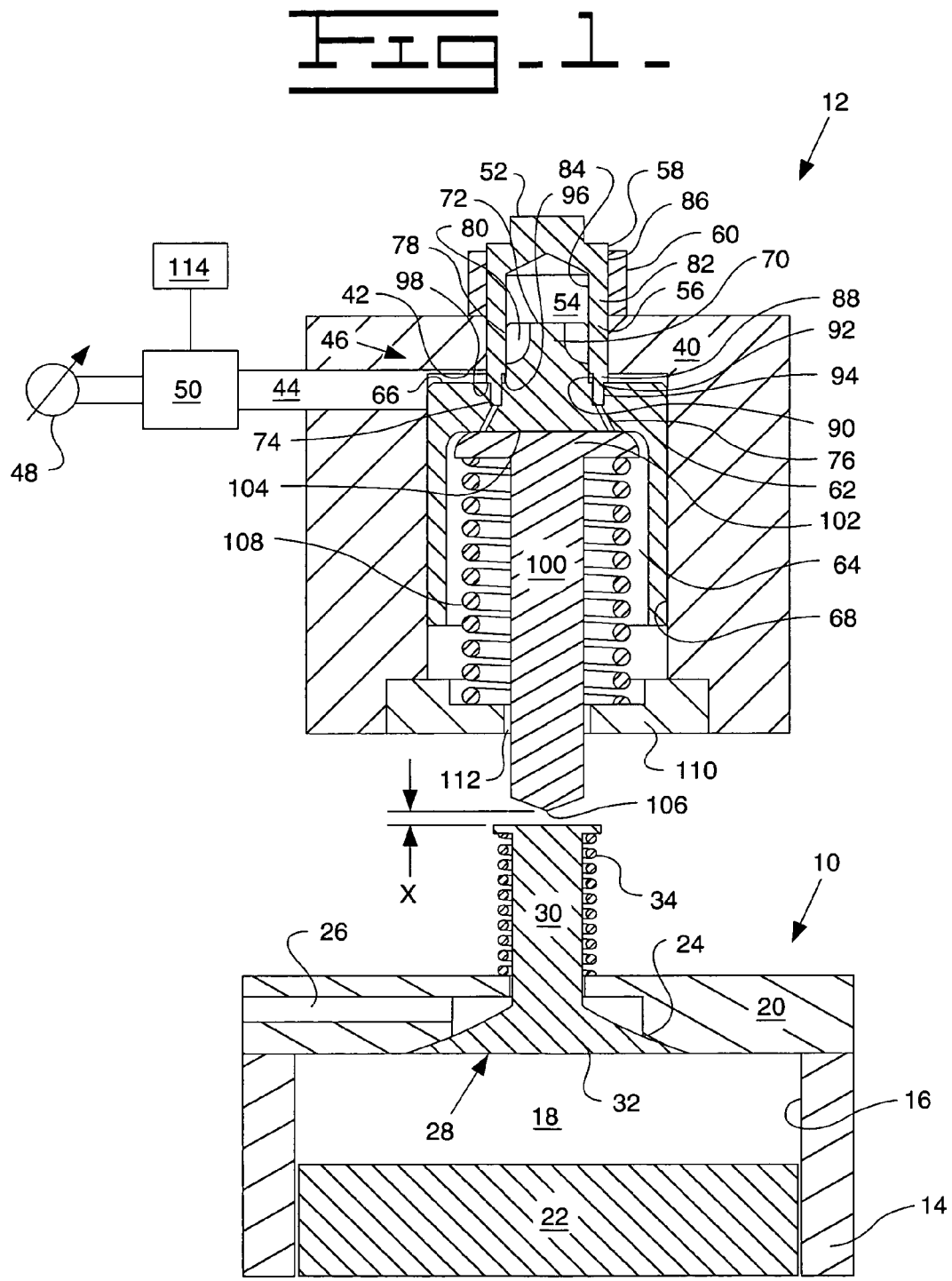
FIG. 1 is a cross-sectional view of an engine valve actuator in accordance with an exemplary embodiment of the present invention, illustrating a piston in a first position.

An exemplary embodiment of an engine valve actuator 12 for an internal combustion engine 10 is illustrated in the Figures. The engine 10 includes an engine block 14 having a cylinder 16 that defines a combustion chamber 18. A cylinder head 20 may be engaged with the engine block 14 to cover the cylinder 16.

As also shown, a piston 22 may be disposed within the cylinder 16. The piston 22 is adapted to reciprocate between a bottom-dead-center position and a top-dead-center position within the cylinder 16. The piston 22 may be connected to a crankshaft (not shown) such that rotation of the crankshaft causes the piston 22 to reciprocate between the bottom-dead-center position and the top-dead-center position in the cylinder 16. Conversely, reciprocating movement of the piston 22 between the bottom-dead-center position and the top-dead-center position within the cylinder 16 will cause a corresponding rotation of the crankshaft.

The engine 10 may, for example, operate in a conventional four-stroke diesel cycle. In a four stroke diesel cycle, the piston 22 moves through an intake stroke, a compression stroke, a combustion stroke, and an exhaust stroke. One skilled in the art will recognize that the engine 10 may operate in other known operating cycles, such as, for example, an Otto cycle.

The cylinder head 20 defines an opening 24 that leads to a passageway 26. For the purposes of the present disclosure, the opening 24 and passageway 26 will be referred to as an exhaust opening and an exhaust passageway. One skilled in the art will recognize, however, that the opening 24 and the passageway 26 may also be an intake opening and an intake passageway.

The cylinder head 20 may define one or more additional exhaust openings as well as one or more intake openings and passageways that lead to and/or from the combustion chamber 18. The exhaust passageway 26 may connect the combustion chamber 18 with an exhaust manifold (not shown). An intake passageway may the connect combustion chamber 18 with an intake manifold (not shown).

An engine valve 28 may be disposed in the exhaust opening 24. For the purposes of the present disclosure, the engine valve 28 will be referred to as an exhaust valve. One skilled in the art will recognize, however, that the engine valve 28 may also be an intake valve or a special purpose valve.

The exhaust valve 28 may include a valve stem 30 and a valve element 32. The exhaust valve 28 may be moved between a first position and a second position. In the first position, the exhaust valve 28 blocks the exhaust opening 24 to prevent a flow of fluid from the combustion chamber 18 to the exhaust passageway 26. In the second position, the exhaust valve 28 allows fluid to flow from the combustion chamber 18 to the exhaust passageway 26.

A valve actuation system (not shown) may be provided to actuate the exhaust valve 28. As one skilled in the art will recognize, the valve actuation system may be a cam-driven system, a hydraulically driven system, an electrically driven system, or a combination and/or variation thereof. The valve actuation system may be adapted to exert a force on the valve stem 30 to thereby move the exhaust valve 28 from the first position to the second position. A valve return spring 34 may be engaged with the valve stem 30 to return the exhaust valve 28 to the first position when the force exerted by the valve actuation system is removed.

The valve actuation system may be adapted to coordinate the opening of the exhaust valve 28 with the movement of the piston 22. For example, the valve actuation system may open the exhaust valve 28 when the piston 22 is moving through an exhaust stroke. In this manner, exhaust gases created during the combustion of fuel in the combustion chamber 18 may be exhausted to the exhaust passageway 26.

The engine 10 may also include a fuel injection system (not shown). The fuel injection system may deliver, for example, diesel fuel, gasoline, natural gas, or other fuel to the combustion chamber 18. The fuel injection system may be configured to inject a certain quantity of fuel into the combustion chamber 18 at a certain point in the operating cycle of the engine 10. For example, the fuel injection system may inject a quantity of diesel fuel into the combustion chamber 18 as the piston 22 moves from a top-dead-center position towards a bottom-dead-center position during an intake stroke.

As also shown in the figures, the valve actuator 12 includes a housing 40. The housing 40 has an inner surface 42 and defines a fluid passageway 44 and an opening 46. A source of pressurized fluid 48, which may be, for example, a variable capacity pump, may controllably supply a flow of pressurized fluid to the opening 46 through the fluid passageway 44. A control valve 50 may be disposed in or connected to the fluid passageway 44 to control the flow of fluid through the fluid passageway 44.

An adjustment member 52 may be disposed in the housing 40. The adjustment member 52 defines a fluid chamber 54 having a wall 56. The adjustment member 52 and the housing 40 may be adapted to allow adjustment of the position of the adjustment member 52 relative to the housing 40. For example, an outer surface 58 of the adjustment member 52 may include threads that are configured to engage corresponding threads in the housing 40, and the adjustment member 52 may be rotated to adjust the position of the adjustment member 52 relative to the housing 40. One skilled in the art will recognize that the position of the adjustment member 52 relative to the housing 40 may be adjusted through other known methods and/or devices, such as, for example, a spring-loaded ball and detent mechanism.

A nut 60 may be engaged with the threads of the adjustment member 52. When the adjustment member 52 is positioned as desired with respect to the housing 40, the nut 60 may be tightened to secure the adjustment member 52 to the housing 40. In this manner, further unintentional movement of the adjustment member 52 relative to the housing 40 may be prevented.

The valve actuator 12 also includes a piston 62 disposed in the housing opening 46. The piston 62 defines a piston chamber 64 and includes a pressure surface 66 and an outer surface 68. The piston 62 also includes a protrusion 70 that extends from the pressure surface 66 to a face 72, and a groove 74 disposed in the pressure surface 66 surrounding the protrusion 70 and in fluid communication with the piston chamber 64 via one or more fluid connections 76.

The protrusion 70 includes an outer surface 78. One or more slots 80 may be formed in a portion of the outer surface 78. For example, the one or more slots 80 may be formed in the protrusion 70 to start at a distance, D, from the pressure surface 66 and extend to the face 72.

The piston 62 is slidably disposed in the opening 46 of the housing 40. The outer surface 68 of the piston 62 may be adapted for a close tolerance fit with the opening 46. The fluid chamber 54 of the adjustment member 52 is adapted to receive the protrusion 70 of the piston 62 with a close tolerance fit. In a preferred embodiment, the protrusion 70 extends at least partially within the fluid chamber 54, and the fluid chamber wall 56 extends at least partially within the groove 74.

The fluid chamber wall 56 of the adjustment member 52 includes a main portion 82 having first inner and outer diameters 84, 86, an intermediate portion 88 having a second inner diameter 90 that is greater than the first inner diameter 84, and an end portion 92 having the second inner diameter 90 and a second outer diameter 94 that is less than the first outer diameter 86. Consequently, the intermediate and end portions 88, 92 respectively define an inner shoulder 96 and an outer shoulder 98.

The piston 62 may be slidably movable within the housing opening 46 relative to the housing 40 and the adjustment member 52 between a first position at which fluid communication is inhibited between the fluid passageway 44 and each of the fluid and piston chambers 54, 64 and the fluid chamber 54 is substantially free from entrapped fluid, a second position at which each of the fluid and piston chambers 54, 64 are connected to the fluid passageway 44, and a third position at which fluid communication is inhibited between the fluid passageway 44 and each of the fluid and piston chambers 54, 64 and the fluid chamber 54 contains entrapped fluid.

In the first position, as best seen in FIG. 1, the protrusion 70 is disposed in the fluid chamber 54 and the fluid chamber wall 56 is disposed in the groove 74 such that the wall outer shoulder 98 engages a portion of the piston pressure surface 66. In this position, the slots 80 in the protrusion 70 are completely within the confines of the fluid chamber 54, and a portion of the protrusion outer surface 78 that is free from slots is within the wall first inner diameter 84. Consequently, except for leakage between the protrusion outer surface 78 and the wall first inner diameter 84, the fluid chamber 54 is isolated from the fluid passageway 44 and is substantially empty and free from entrapped fluid. Likewise, the portion of the fluid chamber wall 56 that extends into the groove 74, again excepting leakage, isolates the piston chamber 64 from the fluid passageway 44. The amount of leakage permitted between the fluid passageway 44 and each of the fluid and piston chambers 54, 64 can be readily controlled according to the respective diameters of the elements that are in slidable mutual engagement.

Figure 2:
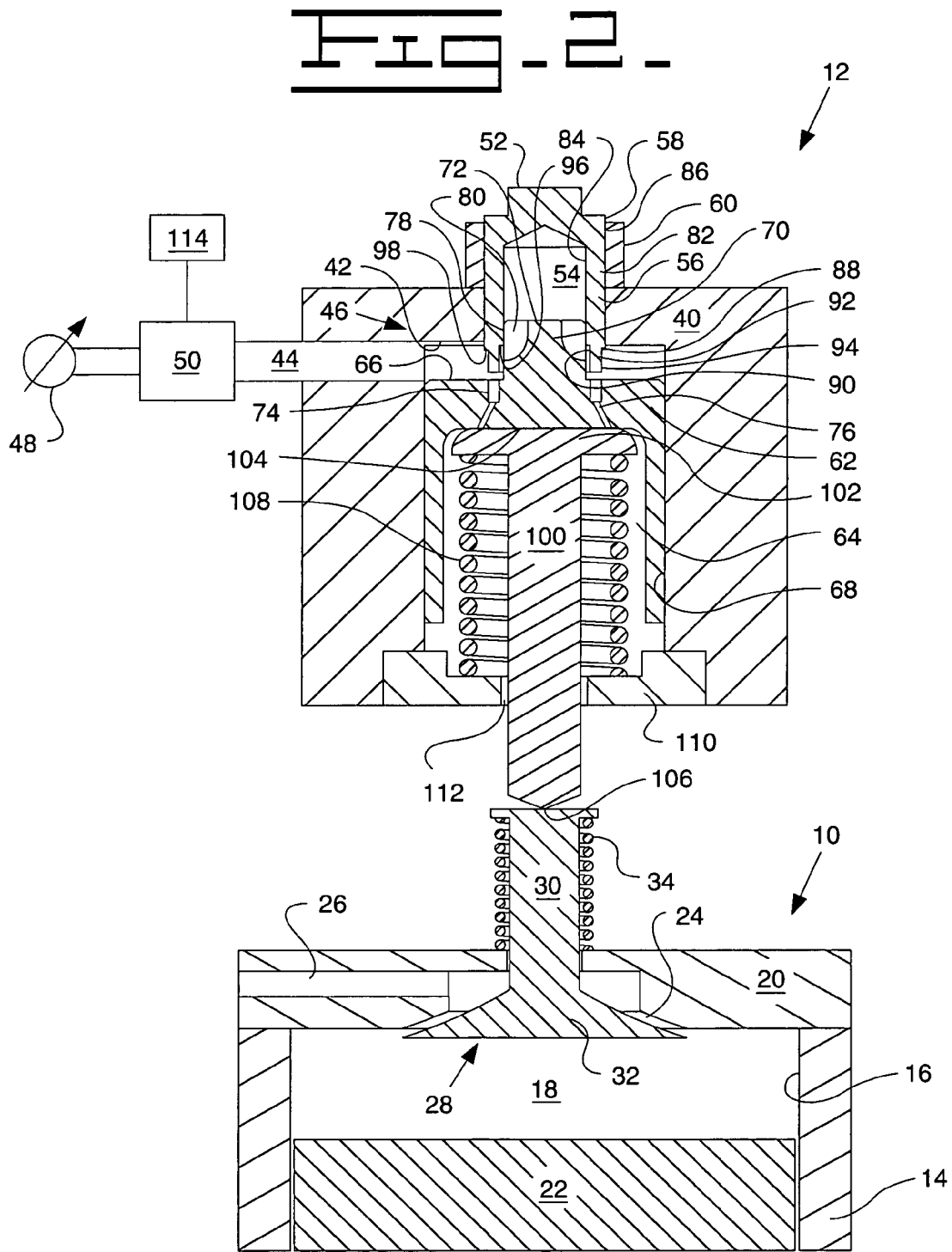
FIG. 2 is a cross-sectional view of an engine valve actuator in accordance with an exemplary embodiment of the present invention, illustrating a piston in a second position.

In the second position, as best seen in FIG. 2, the actuator piston 62 is positioned at a location apart from the adjustment member 52. The protrusion 70 is partially retracted from the fluid chamber 54 and the slots 80 are beyond the wall inner shoulder 96 and are no longer within the wall first inner diameter 84. The protrusion 70 remains guidably engaged with the fluid chamber 54, and the slots 80 provide a path for fluid flow between the fluid passageway 44 and the fluid chamber 54. The chamber wall 56 is retracted from the groove 74 and permits fluid to flow between the piston chamber 64 and the fluid passageway 44, filling the piston chamber 64 with fluid.

Figure 3:
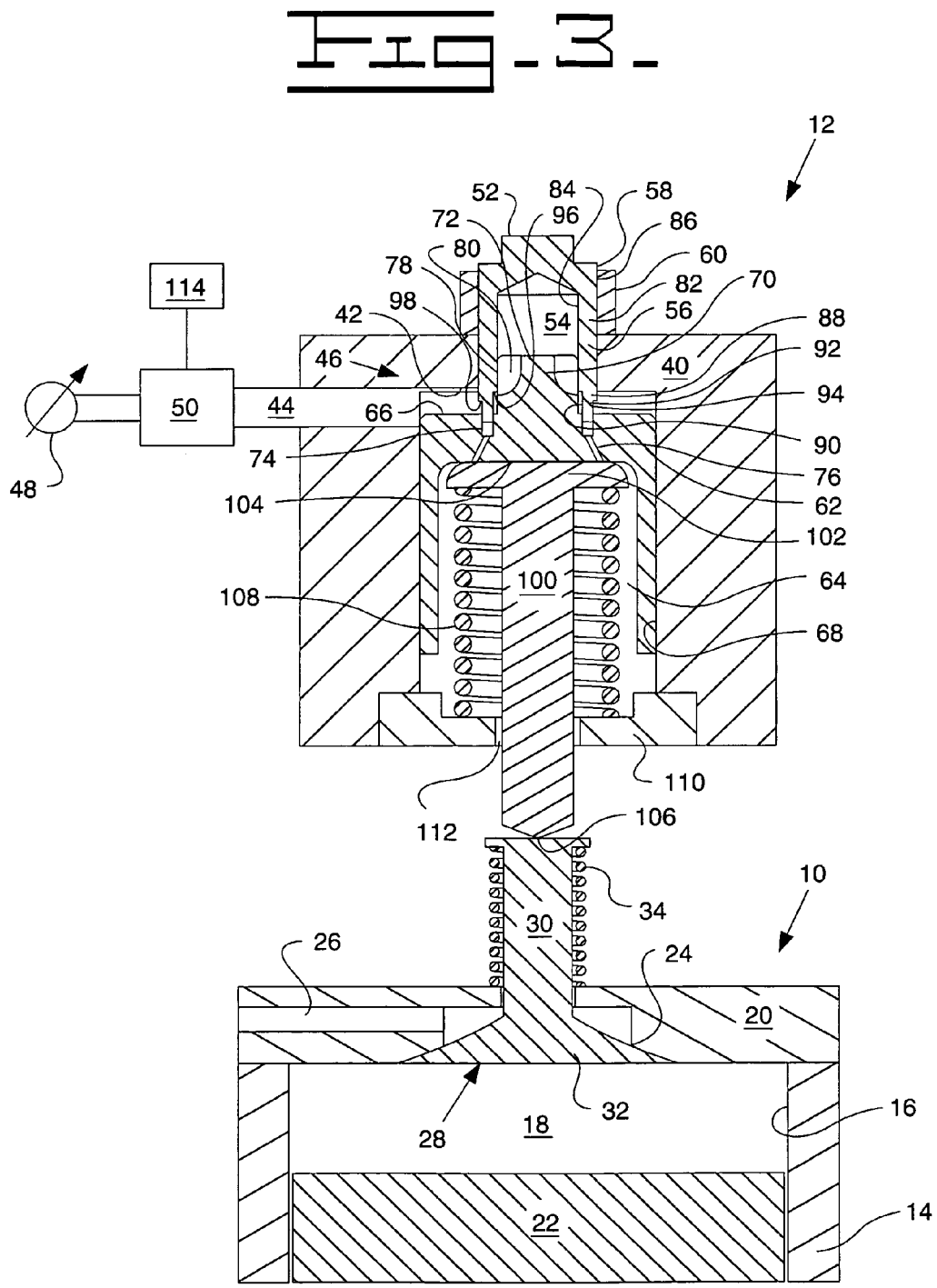
FIG. 3 is a cross-sectional view of an engine valve actuator in accordance with an exemplary embodiment of the present invention, illustrating a piston in a third position.

As best shown in FIG. 3, as the actuator piston 62 moves in the opposite direction, i.e., from the second position towards the first position to the third position, the chamber wall 56 reenters the groove 74, again blocking fluid flow between the fluid and piston chambers 54, 64 and the fluid passageway 44 and leaving fluid trapped in the fluid chamber 54, except for the controlled leakage between the protrusion outer surface 78 and the wall first inner diameter 84.

A push rod 100 may be adapted to engage the piston 62. The push rod 100 includes a head 102 that may engage a contact surface 104 of the piston 62, and an end 106 that extends from the housing 40. The push rod 100 may be adapted to move relative to the housing 40 in response to a corresponding movement of the piston 62. One skilled in the art will recognize that the push rod 100 and piston 62 may be formed as a single piece or as separate pieces.

A piston return spring 108 may be disposed in the piston chamber 64 of the housing 40. A cover plate 110 having an opening 112 that is configured to slidably receive the push rod 100 may be engaged with the housing 40 on one end of the piston return spring 108. The piston return spring 108 may act between the cover plate 110 and the head 102 of the push rod 100 to urge the piston 62 in the direction of the adjustment member 52. The size of the opening 112 providing clearance between the push rod 100 outer diameter and the cover plate 110 may be controlled such that fluid may flow freely out of the piston chamber 64 through the cover plate opening 112. Consequently, pressurized fluid that enters the piston chamber 64 may flow freely out of the piston chamber 64 through the cover plate opening 112, and may reenter the normal engine fluid return path.

A controller 114 may be connected to the control valve 50. The controller 114 may be an electronic control module that includes a microprocessor and memory. As is known to those skilled in the art, the memory may be connected to the microprocessor and may store an instruction set and variables. Associated with the microprocessor and part of the electronic control module may be various other known circuits such as, for example, power supply circuitry, signal conditioning circuitry, and solenoid driver circuitry, among others.

As one skilled in the art will recognize, the controller 114 may be programmed to control one or more aspect of the operation of the engine 10. For example, the controller 114 may be programmed to control the actuation of the control valve 50, the operation of the source of pressurized fluid 48, and the operation of the fuel injection system (not shown).

INDUSTRIAL APPLICABILITY

The engine 10 may be operated to provide power to propel a vehicle or machine such as, for example, an automobile, an on highway truck, or an off highway truck. The engine 10 may be operated in a conventional four-stroke diesel cycle. For the purposes of the present disclosure, the operation of a single cylinder 16 of the engine 10 will be described.

During a conventional operation cycle of the engine 10, the piston 22 moves from a top-dead-center position towards a bottom-dead-center position in an intake stroke. As the piston 22 moves through the intake stroke, the engine valve actuation system opens an intake valve (not shown) associated with the combustion chamber 18. The opening of the intake valve allows air to flow from an intake manifold (not shown) into the combustion chamber 18. The intake air may be at ambient pressure or the intake air may be pressurized, such as, for example, by a turbocharger.

A fuel injection system may inject a quantity of fuel during the intake stroke of the piston 22. The fuel may be injected directly into the combustion chamber 18 or into the intake manifold. The fuel mixes with the intake air to form a combustible mixture.

The piston 22 then moves from the bottom-dead-center position towards the top-dead-center position in a combustion stroke. The movement of the piston 22 within the combustion chamber 18 compresses the air and fuel mixture. The engine 10 may be adapted so that the piston 22 compresses the air and fuel mixture to reach the critical, or combustion, pressure when the piston 22 is at or near the top-dead-center position of the compression stroke.

When the fuel and air mixture reaches the ignition pressure, the fuel ignites and the mixture is combusted. The combustion of the fuel and air mixture drives the piston 22 towards the bottom-dead-center position in a combustion stroke. The driving power of the fuel combustion is translated into an output rotation of a crankshaft (not shown) that is used to propel the vehicle or machine.

The piston 22 then returns from the bottom-dead-center position to the top-dead-center position in an exhaust stroke. During the exhaust stroke, the engine valve actuation system moves the exhaust valve 28 towards the second position to create a fluid passageway from the combustion chamber 18 to the exhaust passageway 26. The movement of the piston 22 towards the top-dead-center position forces combustion exhaust from the combustion chamber 18 into the exhaust passageway 26. The operating cycle of the piston 22 may then begin again with another intake stroke.

When an operator or a controller such as a computer or logic device provides an instruction to decelerate the vehicle or machine, such as, for example, by depressing a brake pedal, the engine 10 may operate in an "engine braking" mode. The controller 114 may instruct the fuel delivery system to cease delivery of fuel to the combustion chambers 18. The controller 114 may also operate the control valve 50 to activate the valve actuator 12 to assist in the deceleration of the vehicle or machine.

In the engine braking mode, the controller 114 opens the control valve 50 to allow pressurized fluid to flow from the source of pressurized fluid 48 through the fluid passageway 44 into the housing opening 46. The pressurized fluid exerts a force on the pressure surface 66 of the actuator piston 62, which causes the piston 62 to move from the first position towards the second position. This movement of the piston 62 causes a corresponding movement of the push rod 100.

As the push rod 100 moves relative to the housing 40, the end 106 of the push rod 100 will move through distance X to engage the exhaust valve 28. The push rod 100 may directly engage the valve stem 30. Alternatively, the push rod 100 may engage another portion of the exhaust valve 28 or an operative portion of the valve actuation system, such as, for example, a bridge connecting a pair of exhaust valves 28.

Continued movement of the piston 62 and the push rod 100 after the push rod end 106 engages the exhaust valve 28 causes the exhaust valve 28 to move from the first position towards the second position to allow a flow of fluid from the combustion chamber 18 to the exhaust passageway 26. The controller 114 may control the opening of the control valve 50 so that the exhaust valve 28 opens when the engine piston 22 is at or near the top-dead-center position of the compression stroke. As will be apparent to one skilled in the art, the exhaust valve 28 may be opened at another point in the operating cycle of the engine to implement another variation on conventional engine valve timing.

When the exhaust valve 28 is opened at the end of a compression stroke, the air compressed by the piston 22 escapes from the combustion chamber 18 through the exhaust passageway 26. The act of compressing air will act to oppose the motion of the crankshaft. Because the air compression does not result in fuel combustion, the piston is not driven through a combustion stroke. Thus, the valve actuator 12 causes the engine 10 to operate as an air compressor that absorbs the kinetic energy of the moving vehicle by opposing the rotation of the crankshaft. The valve actuator 12 will, therefore, assist in the slowing of the moving vehicle or machine.

When the valve lift or opening distance of the exhaust valve 28 has reached a desired maximum, the actuator piston 62 will have moved to the second position at which the fluid chamber wall 56 disengages from the groove 74 and allows fluid to flow from the fluid passageway 44 through the slots 80 into the fluid chamber 54, and through the fluid connections 76 to the piston chamber 64. Because the piston chamber 64 is in fluid communication with the engine fluid return through the cover plate opening 112, the fluid pressure on the piston pressure surface 66 is immediately relieved and the actuator piston 62 and push rod 100 stop further movement away from the adjustment member 52, effectively imposing a travel limit on the engine valve 28. The actuator piston 62 will then remain at a position that just balances the pressure acting on the pressure surface 66 with the counteracting forces imposed by the valve return spring 34 and the piston return spring 108.

To release the engine valve actuator 12 and allow the engine valve 28 to close, the controller 114 may close the control valve 50 and allow fluid to drain from the housing opening 46. As the fluid drains from the opening 46, the force exerted on the pressure surface 66 of the actuator piston 62 decreases. Eventually, the force of the valve return spring 34 and the piston return spring 108 will cause the engine valve 28 to move towards the first position and block the exhaust opening 28.

Following closure of the engine valve 28, the piston return spring 108 will continue to act on the actuator piston 62. The protrusion 70 may remain in at least partial engagement with the fluid chamber 54 to guide the piston 62 as it moves relative to the housing 40. As the protrusion 70 moves relative to the chamber 54, the fluid in the chamber 54 flows through the slots 80 and the fluid passageway 44 to return to the housing opening 46. However, when the slots 80 pass the wall inner shoulder 96 of the adjustment member 52, the fluid passageway 44 is effectively closed. When this occurs, the fluid remaining in the fluid chamber 54 is trapped. The fluid trapped in the chamber 54 prevents further movement of the actuator piston 62 relative to the housing 40 and the adjustment member 52, and the push rod 100 will stop at a position that is closer to the engine valve 28 than if the piston 62 returned to the first position.

When the piston 22 next approaches the top-dead-center position of the compression stroke, the distance that the actuator piston 62 needs to move to open the engine valve 28 is reduced by the distance, X. Thus, when the controller 114 opens the control valve 50, less fluid and less time is required to move the piston 62 and the push rod 100 to open the engine valve 28. In this manner, the response time of the engine valve actuator 12 to the introduction of pressurized fluid to the housing 40 may be improved.

When the engine 10 is no longer experiencing the engine braking condition, the controller 114 will close the control valve 50 and allow fluid to drain from the housing opening 46. The fluid trapped in the fluid chamber 54 will leak at a controlled rate between the protrusion 70 and the adjustment member 52, eventually emptying the fluid chamber 54 of fluid. This will allow the actuator piston 62 to return to the first position, where the pressure surface 66 of the piston 62 engages the wall outer shoulder 98 of the adjustment member 52 chamber wall 56.

The starting position of the actuator piston 62 and the push rod 100 relative to the engine valve 28 may be adjusted by re-positioning the adjustment member 52 relative to the housing 40. By adjusting the threads on the outer surface 58 of the adjustment member 52 to move the adjustment member 52 towards the exhaust valve 28, the distance, X, separating the push rod 100 from the engine valve 28 may be decreased. By adjusting the threads on the outer surface 58 of the adjustment member 52 to move the adjustment member 52 away from the exhaust valve 28, the distance, X, separating the push rod 100 from the engine valve 28 may be increased.

While the engine valve actuator 12 of the present disclosure has been described in relation to an engine braking condition, one skilled in the art will recognize that the described engine valve actuator 12 may be used to implement other variations on a conventional valve actuation timing when the engine 10 is experiencing other operating conditions. For example, the described engine valve actuator 12 may cooperate with an intake valve to implement a "late intake" type Miller cycle when the engine 10 is experiencing certain operating conditions, such as, for example, steady state conditions.

As is apparent from the foregoing description, the present disclosure provides an engine valve actuator 12 that controllably removes the lash between the engine valve actuator 12 and the associated engine valve 28, and that controllably limits the valve-lift produced by the engine valve actuator 12 to a predetermined amount. This may improve control over the timing and operation of the engine valve actuation and thereby lead to enhanced performance of the engine 10.

It will be apparent to those skilled in the art that various modifications and variations can be made in the engine valve actuator 12 of the present invention without departing from the scope of the disclosure. Other embodiments of the engine valve actuator 12 will be apparent to those skilled in the art from consideration of the specification and practice of the valve actuator 12 as disclosed herein. It is intended that the specification and examples be considered as exemplary only, with a true scope of the disclosure being indicated by the following claims and their equivalents.

What is claimed is:

1. An actuator for an engine valve, comprising:
    a housing having an opening;
    an adjustment member disposed in said housing and defining a fluid chamber having a chamber wall;
    a piston disposed in said housing opening, said piston defining a piston chamber and having a pressure surface, a protrusion extending from said pressure surface, and a groove disposed in said pressure surface surrounding said protrusion and in fluid communication with said piston chamber;
    a fluid passageway adapted to controllably communicate pressurized fluid to said housing opening; and
    a push rod operatively engageable with said piston and adapted to controllably actuate said engine valve.

2. An actuator for an engine valve, as set forth in claim 1, wherein said protrusion extends at least partially within said fluid chamber, said fluid chamber wall controllably extends at least partially within said groove, and wherein said piston is slidably movable within said housing opening between a first position at which fluid communication is inhibited between said fluid passageway and each of said fluid and piston chambers and said fluid chamber is substantially free from entrapped fluid, a second position at which each of said fluid and piston chambers are connected to said fluid passageway, and a third position at which fluid communication is inhibited between said fluid passageway and each of said fluid and piston chambers and said fluid chamber contains entrapped fluid.

3. An actuator for an engine valve, as set forth in claim 1, wherein said fluid chamber wall includes a main portion having a first inner diameter and a first outer diameter, an intermediate portion having a second inner diameter greater than said first inner diameter, and an end portion having said second inner diameter and a second outer diameter less than said first outer diameter, said intermediate and end portions respectively defining an inner shoulder and an outer shoulder, said end portion being adapted to slidably engage said groove to a depth limited by said outer shoulder.

4. An actuator for an engine valve, as set forth in claim 2, wherein said protrusion includes a face, an outer surface, and at least one slot in a portion of said outer surface extending from said face towards said pressure surface, said at least one slot providing fluid communication between said fluid passageway and said fluid chamber when said piston is at said second position.

5. An actuator for an engine valve, as set forth in claim 2, wherein said adjustment member is threadably engaged with said housing and adapted to be positionally adjustable relative to said housing.

6. An actuator for an engine valve, as set forth in claim 2, including a fluid control valve connected to said fluid passageway and adapted to control the flow of pressurized fluid to and from said passageway.

7. An actuator for an engine valve, as set forth in claim 2, wherein said piston chamber includes a return spring positioned to urge said piston toward said first position.

8. A method of actuating an engine valve using an actuator engageable with said engine valve, said actuator having a housing, a piston having a pressure surface and a piston chamber and being slidably movable within an opening of said housing and engageable with said engine valve, a fluid passageway in communication with said opening, and an adjustment member disposed within said housing and having a fluid chamber, comprising the steps of:
    connecting a source of pressurized fluid to said fluid passageway and delivering said fluid to said pressure surface of said piston;
    responsively moving said piston from a first position to a second position and responsively actuating said engine valve;

limiting movement of said piston beyond said second position by connecting said fluid and piston chambers to said fluid passageway and permitting said pressurized fluid to flow from said housing opening to said fluid and piston chambers and responsively relieving the pressure on said pressure surface;

disconnecting said source of pressurized fluid from said fluid passageway and responsively moving said piston toward said first position from said second position to a third position;

controllably disconnecting said fluid chamber from said fluid passageway when said piston reaches said third position; and blocking said piston from returning to said first position in response to said fluid entrapped in said fluid chamber.

9. A method, as set forth in claim 8, wherein said fluid chamber has a chamber wall and said piston has a protrusion extending from said pressure surface and a groove disposed in said pressure surface surrounding said protrusion and in fluid communication with said piston chamber, said protrusion extending at least partially within said fluid chamber and said fluid chamber wall controllably extending at least partially within said groove, including the steps of:

inhibiting fluid communication between said fluid passageway and each of said fluid and piston chambers when said piston is at said first position;

connecting said fluid and piston chambers to said fluid passageway in response to said piston moving to said second position from said first position; and disconnecting each of said fluid and piston chambers from said fluid passageway in response to said piston moving to said third position from said second position.

10. A method, as set forth in claim 8, wherein said fluid chamber wall includes a main portion having a first inner diameter and a first outer diameter, an intermediate portion having a second inner diameter greater than said first inner diameter, and an end portion having said second inner diameter and a second outer diameter less than said first outer diameter, said intermediate and end portions respectively defining an inner shoulder and an outer shoulder, including the steps of:

slidably engaging said end portion in said groove; and limiting the depth of said slidable engagement according to the position of said outer shoulder.

11. A method, as set forth in claim 9, wherein said protrusion includes a face, an outer surface, and at least one slot in a portion of said outer surface extending from said face towards said pressure surface, including the step of:

providing fluid communication between said fluid passageway and said fluid chamber through said at least one slot when said piston is at said second position.

12. A method, as set forth in claim 9, wherein said adjustment member is threadably engaged with said housing, including the step of:

adjusting the position of said adjustment member relative to said housing by rotating one of said adjustment member and said housing relative to the other.

13. A method, as set forth in claim 9, wherein a fluid control valve is connected to said fluid passageway, and including the step of:

actuating said fluid control valve to control the flow of pressurized fluid to and from said passageway.

14. An engine, comprising:

at least one engine block defining at least one cylinder;
an engine piston disposed in said at least one cylinder;
at least one engine valve associated with said at least one cylinder;
a housing having an opening;
an adjustment member disposed in the housing and defining a fluid chamber having a chamber wall;
a piston disposed in said housing opening, said piston defining a piston chamber and having a pressure surface, a protrusion extending from said pressure surface, and a groove disposed in said pressure surface surrounding said protrusion and in fluid communication with said piston chamber;
a fluid passageway adapted to controllably communicate pressurized fluid to said housing opening; and
a push rod operatively engagable with said piston and adapted to controllably actuate said engine valve.

15. An engine, as set forth in claim 14, wherein said protrusion extends at least partially within said fluid chamber, said fluid chamber wall controllably extends at least partially within said groove, and said piston is slidably movable within said housing opening between a first position at which fluid communication is inhibited between said fluid passageway and each of said fluid and piston chambers and said fluid chamber is substantially free from entrapped fluid, a second position at which each of said fluid and piston chambers are connected to said fluid passageway, and a third position at which communication is inhibited between said fluid passageway and each of said fluid and piston chambers and said fluid chamber contains entrapped fluid.

16. An engine, as set forth in claim 14, wherein said fluid chamber wall includes a main portion having a first inner diameter and a first outer diameter, an intermediate portion having a second inner diameter greater than said first inner diameter, and an end portion having said second inner diameter and a second outer diameter less than said first outer diameter, said intermediate and end portions respectively defining an inner shoulder and an outer shoulder, said end portion being adapted to slidably engage said groove to a depth limited by said outer shoulder.

17. An engine, as set forth in claim 15, wherein said protrusion includes a face, an outer surface, and at least one slot in a portion of said outer surface extending from said face towards said pressure surface, said at least one slot providing fluid communication between said fluid passageway and said fluid chamber when said piston is at said second position.

18. An engine, as set forth in claim 15, wherein said adjustment member is threadably engaged with said housing and adapted to be positionally adjustable relative to said housing.

19. An engine, as set forth in claim 15, including a fluid control valve connected to said fluid passageway and adapted to control the flow of pressurized fluid to and from said passageway.

20. An engine, as set forth in claim 15, wherein said piston chamber includes a return spring positioned to urge said piston toward said first position.

21. An actuator for an engine valve, comprising:

a housing having an opening;
a fluid passageway adapted to controllably communicate pressurized fluid to said housing opening;
a piston disposed in said housing opening, said piston defining a piston chamber and having a pressure surface, a protrusion extending from said pressure surface, and a groove disposed in said pressure surface surrounding said protrusion and in fluid communication with said piston chamber;
an adjustment member disposed in said housing and defining a fluid chamber having a chamber wall, said fluid chamber wall including a main portion having a first inner diameter and a first outer diameter, an intermediate portion having a second inner diameter greater than said first inner diameter, and an end portion having said second inner diameter and a second outer diameter less than said first outer diameter, said intermediate and end portions respectively defining an inner shoulder and an outer shoulder, said end portion being adapted to slidably engage said groove to a depth limited by said outer shoulder;

wherein said protrusion extends at least partially within said fluid chamber, said fluid chamber wall controllably extends at least partially within said groove, and said piston is slidably movable within said housing opening between a first position at which fluid communication is inhibited between said fluid passageway and each of said fluid and piston chambers, a second position at which each of said fluid and piston chambers are connected to said fluid passageway, and a third position at which fluid communication is inhibited between said fluid passageway and said fluid and piston chambers; and a push rod operatively engageable with said piston and adapted to controllably actuate said engine valve.

22. An actuator for an engine valve, as set forth in claim 21, wherein said protrusion includes a face, an outer surface, and at least one slot in a portion of said outer surface extending from said face towards said pressure surface, said at least one slot providing fluid communication between said fluid passageway and said fluid chamber when said piston is at said second position.

* * * * *